No. 745,650. PATENTED DEC. 1, 1903.
G. NEWLAND.
CAR WHEEL.
APPLICATION FILED AUG. 4, 1903.
NO MODEL.
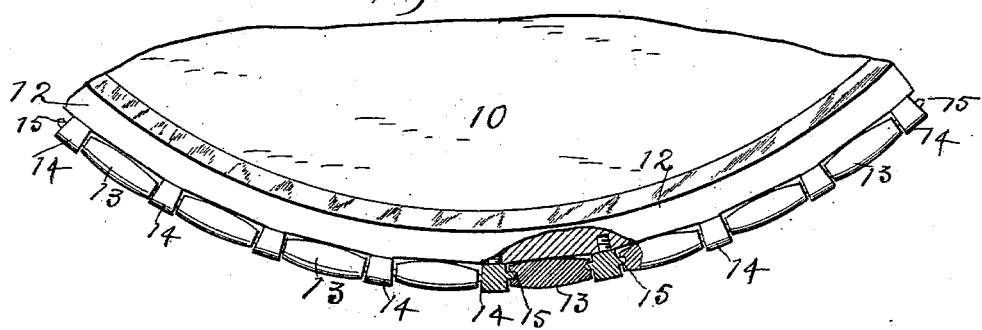
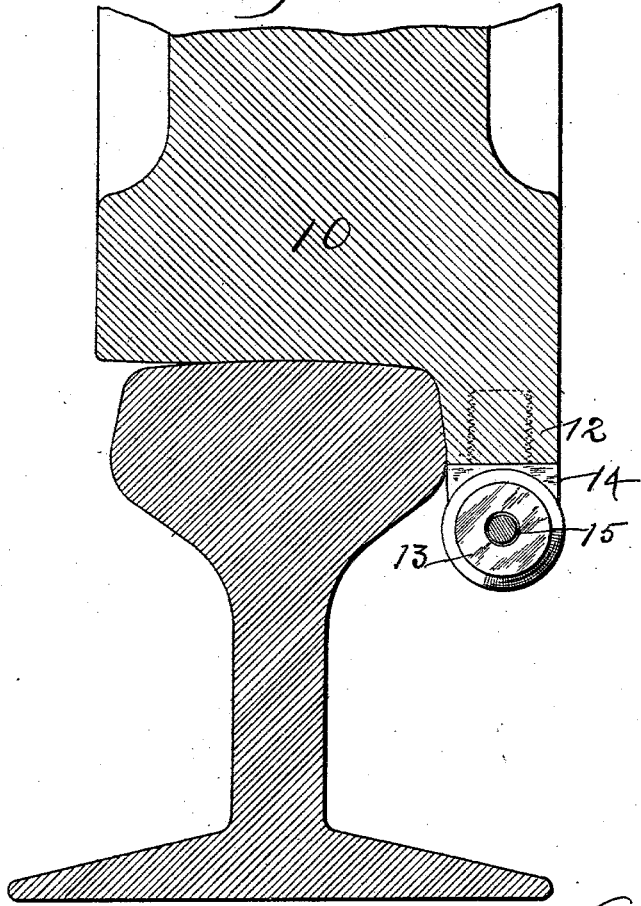
Witnesses:
L. H. Heibrock.
K. K. Keffer.
Inventor: Grant Newland,
By Thomas G. Orwig, Attorney.

No. 745,650. Patented December 1, 1903.

UNITED STATES PATENT OFFICE.

GRANT NEWLAND, OF LINDEN, IOWA, ASSIGNOR OF ONE-HALF TO ARTHUR G. CLARK, OF LINDEN, IOWA.

CAR-WHEEL.

SPECIFICATION forming part of Letters Patent No. 745,650, dated December 1, 1903.

Application filed August 4, 1903. Serial No. 168,241. (No model.)

*To all whom it may concern:*

Be it known that I, GRANT NEWLAND, a citizen of the United States, residing at Linden, in the county of Dallas and State of Iowa, have invented a new and useful Car-Wheel, of which the following is specification.

My object is to prevent the dangers, accidents, and loss of life and property incident to car-wheels rising on the rails and the flanges of the wheels from becoming disengaged from the heads of the rails and causing the derailing of cars.

My invention consists in the construction and combination of rollers with the flange of a wheel, as hereinafter set forth, pointed out in my claims, and illustrated in the accompanying drawings, in which—

Figure 1 shows a section of a car-wheel and rollers journaled in recesses in the flange as required for practical use. Fig. 2 is a sectional view that shows the position of one of the tapering rollers in the flange of the car-wheel relative to a track-rail upon which the car-wheel rests in its normal position when a car is stationary on a railroad-track.

The numeral 10 designates a car-wheel, and 12 the flange that has rollers 13 journaled thereto. The flange must have recesses in which to locate the rollers, and in place of making the flange wide, as usual, it may be reduced, as shown in Fig. 2, and extended by means of journal-bearings 14, provided with integral screws seated in the periphery of the reduced flange, as shown, or when the flange is of common form and width sections of the flange may be cut out to admit the rollers and pivots 15, formed on or fixed to the ends of the parts that remain integral with the flange, and the rollers 13 formed of mating parts and fitted in the recesses in the flange of the wheel and provided with conical cavities 16 in their ends to admit the pivots 15, and the two parts of the roller then riveted securely together to extend longitudinally relative to the flange of the wheel. The ends of the roller are smaller in diameter than their central portions, as shown, and necessarily so in order that when a wheel rotates on a rail the ends of the rollers will not come in contact with the rail, but will successively pass first down and then up at the side of ball of the rail, and whenever the tread-surface of the wheel rises from the rail the central and large portion of the rollers will extend parallel with the rail as it passes by the rail and come in contact with the ball of the rail as required to prevent the flange of the wheel rising high enough to allow the wheel to become free from the rail and a car from becoming derailed.

Having thus described the purpose of my invention and its construction and operation, its practical utility will be obvious to persons familiar with the art to which it pertains.

What I claim as new, and desire to secure by Letters Patent, is—

1. A car-wheel having recesses in its flange and rollers journaled in said recesses to extend longitudinally relative to the flange of the wheel for the purposes stated.

2. A roller composed of two mating parts riveted together and provided with cavities in its ends adapted to admit pivots and the central portion of the roller larger in diameter than its end portions, for the purposes stated.

GRANT NEWLAND.

Witnesses:
H. E. WARNER,
I. A. ROBERTS.